(12) United States Patent
Yu

(10) Patent No.: US 8,373,500 B2
(45) Date of Patent: Feb. 12, 2013

(54) VOLTAGE BIASING CIRCUIT AND DATA PROCESSING SYSTEM HAVING THE SAME

(75) Inventor: Jin Hyuck Yu, Hwasung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 381 days.

(21) Appl. No.: 12/684,459

(22) Filed: Jan. 8, 2010

(65) Prior Publication Data

US 2010/0177232 A1 Jul. 15, 2010

(30) Foreign Application Priority Data

Jan. 13, 2009 (KR) .................. 10-2009-0002494

(51) Int. Cl.
*G05F 1/10* (2006.01)
(52) U.S. Cl. ........................................ 327/538
(58) Field of Classification Search .................. None
See application file for complete search history.

(56) References Cited

U.S. PATENT DOCUMENTS

| 7,289,286 | B1 * | 10/2007 | Voo | 360/67 |
| 8,026,968 | B2 * | 9/2011 | Pahr | 348/308 |
| 2004/0164790 | A1 | 8/2004 | Moon et al. | |
| 2009/0289685 | A1 * | 11/2009 | Quinn | 327/333 |

FOREIGN PATENT DOCUMENTS

| JP | 2004-259275 | 9/2004 |
| JP | 2006-059057 | 3/2006 |
| JP | 2008-098868 | 4/2008 |
| KR | 1020040076071 | 8/2004 |

* cited by examiner

*Primary Examiner* — Lincoln Donovan
*Assistant Examiner* — Sibin Chen
(74) *Attorney, Agent, or Firm* — F. Chau & Associates, LLC

(57) ABSTRACT

A voltage biasing circuit includes a metal-oxide-semiconductor (MOS) transistor, a voltage control circuit controlling a voltage between a gate and a source of the MOS transistor to operate the MOS transistor in a sub-threshold range, and a capacitor connected to the MOS transistor. The voltage biasing circuit may further include a voltage buffer connected between the voltage control circuit and the MOS transistor.

15 Claims, 5 Drawing Sheets

VOLTAGE BIASING CIRCUIT AND DATA PROCESSING SYSTEM HAVING THE SAME

CROSS-REFERENCE TO RELATED APPLICATIONS

This application claims priority under 35 U.S.C. §119 to Korean Patent Application No. 10-2009-0002494, filed on 13 Jan., 2009, in the Korean Intellectual Property Office, the disclosure of which is incorporated by reference in its entirety herein.

BACKGROUND

1. Technical Field

Embodiments of the inventive concept relate to a bias supply circuit, and more particularly, to a voltage biasing circuit to reduce or eliminate noise included in a bias voltage.

2. Discussion of Related Art

Biasing in electronics is a method of establishing predetermined voltages and/or currents at various points of an electronic circuit to set an appropriate operating point. When a bias voltage or bias current is supplied to a particular terminal, an RC filtering circuit may be used to eliminate noise included in the bias voltage or bias current.

However, an RC circuit requires a resistor having a resistance value on the order of several hundred kilo ohms to several mega ohms to filter low frequency noise. Since resistors of this size can be quite large, and may take up a large area on a circuit, their presence may prevent miniaturization of the circuit.

Thus, there is a need for biasing circuits that can reduce noise that have a smaller area, and systems including the same.

SUMMARY

A voltage biasing circuit according to an exemplary embodiment of the inventive concept includes a MOS transistor, a voltage control circuit, and a capacitor. The voltage control circuit controls a voltage between a gate and a source of the MOS transistor to allow the MOS transistor to operate in a sub-threshold range. The capacitor is connected to the MOS transistor.

The voltage biasing circuit may further include a voltage buffer connected between the voltage control circuit and the MOS transistor. The voltage control circuit may include a resistor connected between an input terminal of the voltage buffer and the gate of the MOS transistor, and a current supply source connected to the resistor and generating current flowing into the resistor. The voltage level applied by the current supply source across the resistor may be lower than a threshold voltage of the MOS transistor.

A terminal of the capacitor may be connected to the source of the MOS transistor and another terminal of the capacitor is connected to ground. The voltage buffer may be an OPAMP that is configured as a unity gain buffer amplifier. An output terminal of the voltage buffer may be connected to the source of the MOS transistor and another input terminal of the voltage buffer may be connected to the source of the MOS transistor.

A tuning circuit according to an exemplary embodiment of the inventive concept includes a voltage biasing circuit and a tuning block. The voltage biasing circuit includes a current source, a resistor connected to the current supply source, a capacitor, a voltage buffer, and a MOS transistor. A first input terminal of the voltage buffer is connected to the resistor. A second other input terminal of the voltage buffer is connected to an output terminal of the buffer. The gate of the MOS transistor is connected the resistor and the current source, the source of the MOS transistor is connected to the output terminal of the voltage buffer, and the drain of the MOS transistor is connected the capacitor. An input terminal of the tuning block is connected the drain of the MOS transistor of the voltage biasing circuit. The current source is configured to output a current that generates a voltage across the resistor that is lower than the threshold voltage of the MOS transistor.

The tuning block may include a first varactor connected at one end to the input terminal and at the other end to a second capacitor and a second resistor, and a second varactor connected at one end to the input terminal and at the other end to a third capacitor and a third resistor, where the second resistor is connected to the third resistor. The second capacitor may be connected to a positive output terminal and the third capacitor may be connected to a negative output terminal. The cathode of the first varactor may be connected to the positive output terminal via the second capacitor and the cathode of the second varactor may be connected to the negative output terminal via the third capacitor. At least one of the first varactor and the second varactor may be an accumulation mode MOSFET (AMOS) varactor. The voltage buffer may an OPAMP that is configured as a unity gain buffer amplifier.

A data processing system according to an exemplary embodiment of the inventive concept includes a voltage biasing circuit and a data processing circuit processing data by using a bias voltage output from the voltage biasing circuit. The voltage biasing circuit includes a MOS transistor, a voltage control circuit controlling a voltage between a gate and a source of the MOS transistor to allow the MOS transistor to operate in a sub-threshold range, and a capacitor connected to the MOS transistor.

The voltage biasing circuit may further include a voltage buffer connected between the voltage control circuit and the MOS transistor. The data processing circuit may include a memory device receiving the bias voltage, a processor controlling operations of the memory device, a system bus connected to the memory device and the processor, and an image sensor that converts an optical signal to an electric signal. The image sensor may be one of a charge-coupled device (CCD) or a complementary metal-oxide semiconductor (CMOS) image sensor. The data processing circuit may further include a wireless interface connected to the processor and configured to wirelessly communicate data with an external wireless apparatus.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF EXEMPLARY EMBODIMENTS

Figure 1:
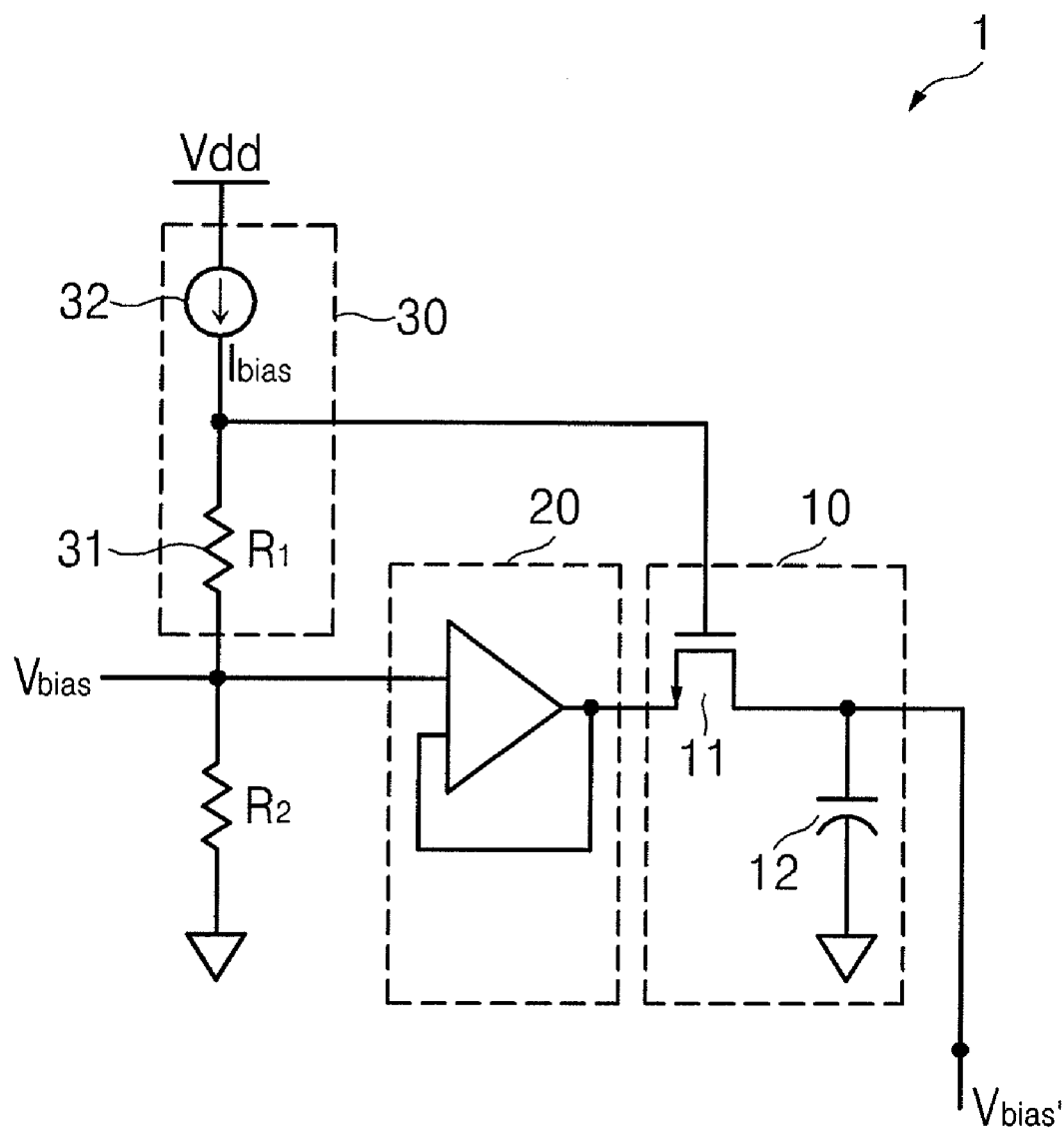
FIG. 1 is a schematic circuit diagram of a voltage biasing circuit according to an exemplary embodiment of the inventive concept.

Hereinafter, the inventive concept will be described in detail by explaining exemplary embodiments of the inventive concept with reference to the attached drawings. Like reference numerals in the drawings denote like elements.

FIG. 1 is a schematic circuit diagram of a voltage biasing circuit 1 according to an exemplary embodiment of the inventive concept. Referring to FIG. 1, the voltage biasing circuit 1 receives a first bias voltage $V_{bias}$ that includes a DC component and which may additionally include some noise. The voltage biasing circuit 1 outputs a second bias voltage $V_{bias'}$ having only the DC component or substantially only the DC component by eliminating the noise or reducing the amount of noise included in the first bias voltage $V_{bias}$. The first bias voltage $V_{bias}$ may be received from an external source.

The second bias voltage $V_{bias'}$ may be applied to a circuit that does not have a current supply path and needs a predetermined bias voltage. The second bias voltage $V_{bias'}$ may be applied to a data processing circuit or a system that needs a bias voltage. The voltage biasing circuit 1 may be referred to as a low noise biasing circuit or an RC filtering circuit.

As illustrated in FIG. 1, the voltage biasing circuit 1 may include a noise eliminating circuit 10 and a current blocking circuit 20. The noise eliminating circuit 10 may output the second bias voltage $V_{bias'}$ by eliminating noise or reducing included in the first bias voltage $V_{bias}$. Also, as illustrated in FIG. 1, the noise eliminating circuit 10 may include a (metal-oxide-semiconductor) MOS transistor 11 and a capacitor 12 connected to the MOS transistor 11.

The MOS transistor 11 may be controlled to operate in a sub-threshold range so that the MOS transistor 11 can act like a single equivalent resistor. In this way, the MOS transistor 11 may be set to have a large resistance value using a small area. For example, when a resistance value of 5 MΩ is to be realized, a general resistance element needs a size of about 70 μm×6 μm. However, when the MOS transistor 11 is used, a resistance of 5 MΩ may be obtained only with the size of 4 μm×6 μm. Thus, using the MOS transistor 11 as opposed to a resistor has an effect of reducing the size of the noise eliminating circuit 10 by about 95% (=1−((4×6)/(70×6))).

As described above, the MOS transistor 11 may be controlled to operate in the sub-threshold range. The voltage biasing circuit 1 may further include a voltage controlling circuit 30 to control a voltage applied to the MOS transistor 11 so that the MOS transistor 11 may maintain an operation state in the sub-threshold range.

The voltage control circuit 30 may include a resistor $R_1$ 31 connected between a source and a gate of the MOS transistor 11 and a current supply source 32 connected to the resistor $R_1$ 31 and generating current flowing into the resistor $R_1$ 31.

Also, as illustrated in FIG. 1, the voltage biasing circuit 1 may include the current blocking circuit 20 to block current from being supplied to the noise eliminating circuit 10. According to an exemplary embodiment of the inventive concept, the current blocking circuit 20 may be a voltage buffer. For example, the voltage buffer may be an OPAMP that is configured as a unity gain buffer amplifier. The current blocking circuit 20 is formed between the noise eliminating circuit 10 and the voltage control circuit 30. Since the input impedance of the current blocking circuit 20 may be very high, substantially infinite, or infinite (∞), the supply of current to the noise eliminating circuit 10 may be efficiently blocked.

When current is supplied to the noise eliminating circuit 10, a voltage drop is generated in the MOS transistor 11 in proportion to the amount of effective equivalent resistance of the MOS transistor 11. When the voltage drop is generated in the MOS transistor 11, an undesired bias voltage may be output from an output terminal so that the supply of current to the noise eliminating circuit 10 may be blocked. Also, as the current blocking circuit 20 is realized by a voltage buffer, the time to follow a buffer output voltage to a buffer input voltage may be minimized.

Also, as described above, the voltage control circuit 30 may control the MOS transistor 11 to always operate in the sub-threshold range. The first bias voltage $V_{bias}$ may be input to the source of the MOS transistor 11, while a third bias voltage ($=V_{bias}+I_{bias}\times R_1$) may be input to the gate of the MOS transistor 11.

Thus, the voltage difference between the gate and source of the MOS transistor 11 may be maintained to be $I_{bias}\times R_1$. The MOS transistor 11 may always operate in the sub-threshold range by setting the value of $I_{bias}\times R_1$ to be lower than a threshold voltage of the MOS transistor 11. For example, when the threshold voltage of the MOS transistor 11 is about 0.5 V, the value of $I_{bias}\times R_1$ is set to be about 0.2 V so that the MOS transistor 11 may operate in the sub-threshold range.

The voltage biasing circuit 1 may also include a second resistor $R_2$ that is connected at one end to the first resistor $R_1$ and an input terminal of the voltage buffer, and connected at the other end to ground.

Figure 2:
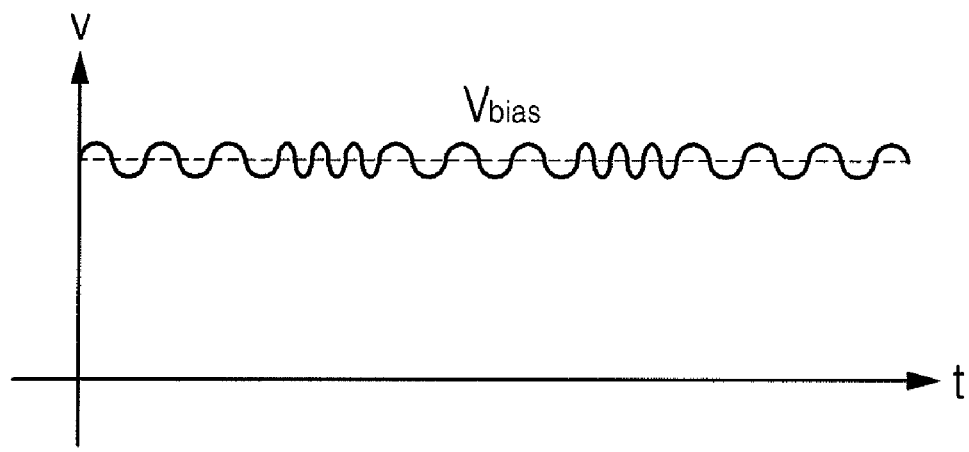
FIG. 2 is an exemplary graph for explaining noise filtering of the voltage biasing circuit according to an exemplary embodiment of the inventive concept.
Figure 2:
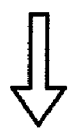
Figure 2:
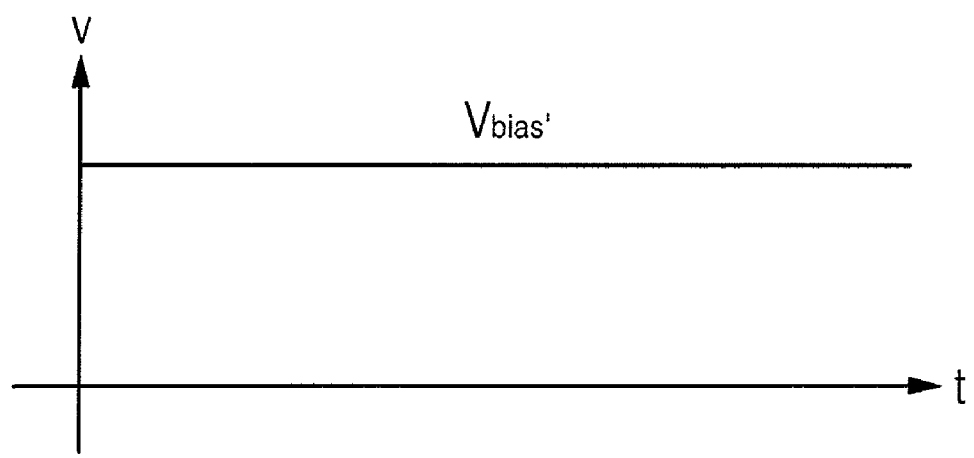

FIG. 2 is a graph for explaining noise filtering of the voltage biasing circuit 1 according to an exemplary embodiment of the inventive concept. Referring to FIGS. 1 and 2, the first bias voltage $V_{bias}$ may be output from another bias circuit and the first bias voltage $V_{bias}$ may include a noise component as illustrated in FIG. 2. For example, when the first bias voltage $V_{bias}$ is a voltage output from a proportion to absolute temperature (PTAT) circuit, phase noise deterioration may be generated in the first bias voltage $V_{bias}$ due to noise generated by the PTAT circuit.

Thus, the noise component may be efficiently removed by the voltage biasing circuit 1. FIG. 2 illustrates a graph showing the second bias voltage Vbias' where the noise is eliminated. As illustrated in FIG. 2, the second bias voltage Vbias' where the noise is eliminated may include only a pure DC component.

Figure 3:
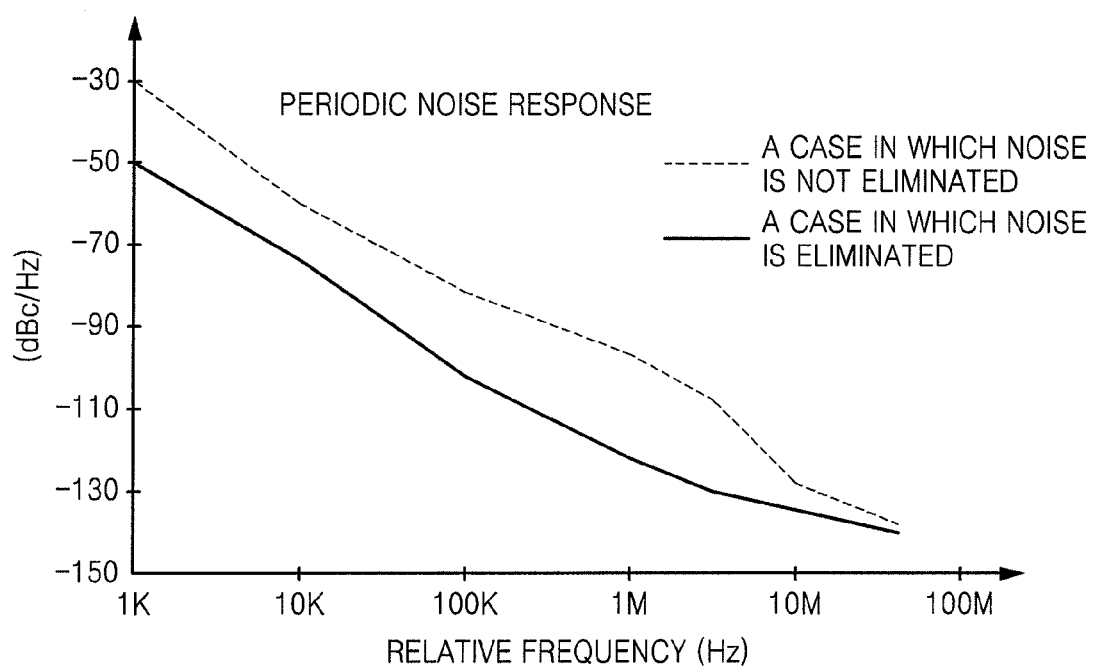
FIG. 3 is another graph for explaining noise filtering of the voltage biasing circuit according to an exemplary embodiment of the inventive concept.

FIG. 3 is another graph for explaining noise filtering of the voltage biasing circuit 1 according to an exemplary embodiment of the inventive concept. Referring to FIGS. 1 through 3, FIG. 3 is a graph showing a measurement of the amount of periodic noise response according to a relative frequency when noise is not eliminated from a bias voltage and when noise is eliminated from the bias voltage. As illustrated in FIG. 3, it can be seen that the phase noise deteriorated generated in the bias voltage is considerably reduced when the voltage biasing circuit 1 according to an exemplary embodiment of the inventive concept is used.

Figure 4:
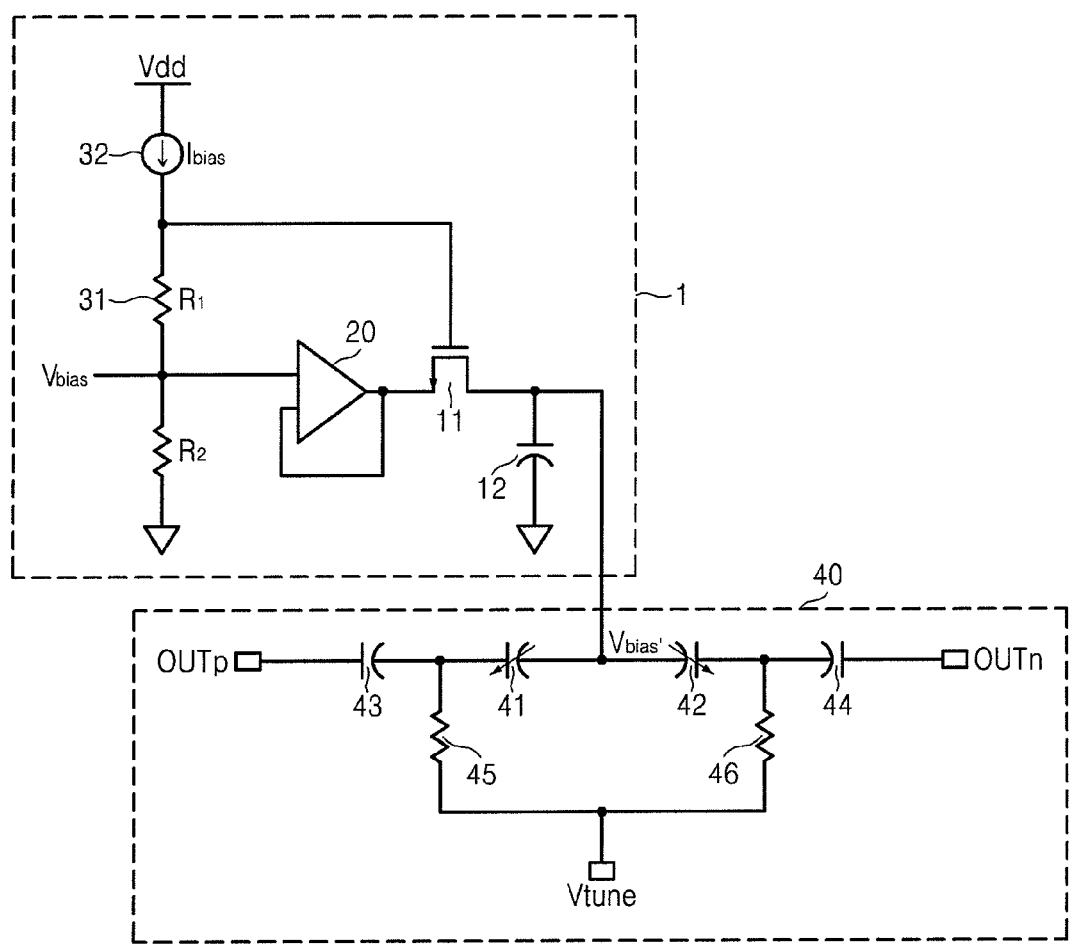
FIG. 4 is a schematic circuit diagram of a fine tuning block having the voltage biasing circuit of the FIG. 1 according to an exemplary embodiment of the inventive concept.

FIG. 4 is a schematic circuit diagram of a fine tuning block 40 including the voltage biasing circuit 1 of FIG. 1. Referring to FIGS. 1 through 4, as described above, the second bias voltage Vbias' may be applied to a circuit that needs a predetermined bias voltage in which a current supply path does not exit.

Although in FIG. 4 the second bias voltage $V_{bias'}$ from which noise is eliminated is supplied to the fine tuning block 40 included in a voltage controlled oscillator (VCO), this is merely for ease of understanding embodiments of present inventive concept and thus the present inventive concept is not limited thereto.

The fine tuning block 40 may use the second bias voltage $V_{bias'}$ output from the voltage biasing circuit 1, as a reference voltage. The fine tuning block 40 may include a first varactor 41, a second varactor 42, a first capacitor 43, a second capacitor 44, a first resistor 45, and a second resistor 46. The first varactor 41 and the second varactor 42 may be an accumulation mode MOSFET (AMOS) varactor, but embodiments of the present inventive concept is not limited thereto.

The cathode of the first varactor 41 may be connected to a positive output terminal OUTp via the first capacitor 43. The cathode of the second varactor 42 may be connected to a negative output terminal OUTn via the second capacitor 44.

Figure 5:
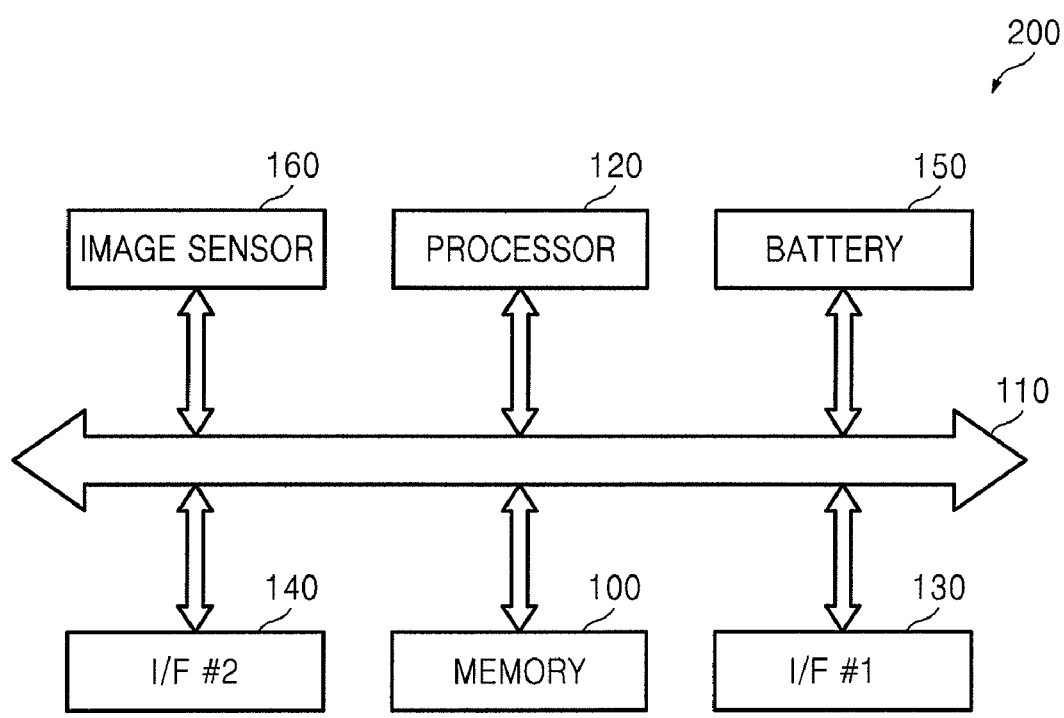
FIG. 5 is a schematic block diagram of a memory system according to an exemplary embodiment of the inventive concept.

FIG. 5 is a schematic block diagram of a memory system 200 according to an exemplary embodiment of the inventive concept. Referring to FIGS. 1 through 5, a memory device 100 of FIG. 5 may include the voltage biasing circuit 1 according to an exemplary embodiment of the present inventive concept and supply a bias voltage to a terminal that needs a bias voltage.

Referring to FIG. 5, the memory system 200 may include the memory device 100 and a processor 120, which are connected to a system bus 110. The processor 120 may generate a plurality of control signals to control a program operation (or a write operation), a read operation, or a verification operation of the memory device 100. Thus, a control block (not shown) of the memory device 100 may perform the program operation (or a write operation), the read operation, or the verification operation in response to the control signal output from the processor 120.

When the memory system 200 is implemented in a portable device, the memory system 200 may further include a battery 150 for supplying operation power to the memory device 100 and the processor 120.

The portable device may include portable computers, digital cameras, personal digital assistants (PDAs), cellular telephones, MP3 players, portable multimedia players (PMPs), automotive navigation systems, memory cards, system cards, game consoles, electronic dictionaries, solid state disks, etc.

The memory system 200 may further include an interface, for example, an input/output device 130, to communicate data with an external data processing apparatus. When the memory system 200 is a wireless system, the memory system 200 may further include a wireless interface 140. The wireless interface 140 may be connected to the processor 120 and wirelessly communicate data with an external wireless apparatus via the system bus 110.

The wireless system may be wireless apparatuses such as PDAs, portable computers, cellular telephones, pagers, digital cameras, RFID readers, RFID systems, etc. Also, the wireless system may be a wireless local area network (WLAN) system, a wireless personal area network (WPAN) system, a cellular network, etc.

When the memory system 200 is an image pick-up device, image capture device, or image processing system, the memory system 200 may further include an image sensor 160 that converts an optical signal to an electric signal. The image sensor 160 may be an image sensor using a charge-coupled device (CCD) or a complementary metal-oxide semiconductor (CMOS) image sensor. The memory system 200 may be a digital camera or a cellular telephone having a digital camera. Also, the memory system 200 may be a satellite system having a camera attached thereto.

As described above, the voltage biasing circuit according to at least one embodiment of the inventive concept may generate and output a bias voltage from which noise is reduced or eliminated using a smaller area.

While the inventive concept has been particularly shown and described with reference to exemplary embodiments thereof, it will be understood that various changes in form and details may be made therein without departing from the spirit and scope of the disclosure.

What is claimed is:

1. A voltage biasing circuit comprising:
   a metal-oxide-semiconductor (MOS) transistor;
   a voltage control circuit controlling a voltage between a gate and a source of the MOS transistor to operate the MOS transistor in a sub-threshold range; and
   a capacitor connected to the MOS transistor,
   wherein the voltage control circuit comprises:
      a resistor configured to supply current to the source and connected to the gate; and
      a current supply source connected to the resistor and the gate,
      wherein the resistor and the current supply source are configured such that a voltage level across the resistor is lower than a threshold voltage of the transistor,
      wherein a terminal of the capacitor is connected to the drain of the MOS transistor and another terminal of the capacitor is connected to ground.

2. The voltage biasing circuit of claim 1, further comprising a voltage buffer connected between the voltage control circuit and the MOS transistor.

3. The voltage biasing circuit of claim 2, wherein the voltage buffer is an OPAMP that is configured as a unity gain buffer amplifier.

4. The voltage biasing circuit of claim 2, wherein an output terminal of the voltage buffer is connected to the source of the MOS transistor and an input terminal of the voltage buffer is connected to the source of the MOS transistor.

5. A tuning circuit comprising:
   a voltage biasing circuit comprising:
   a current source;
   a resistor connected to the current source;
   a capacitor;
   a voltage buffer, wherein a first input terminal of the voltage buffer is connected to the resistor, and a second other input terminal of the voltage buffer is connected to an output terminal of the buffer; and
   a metal-oxide-semiconductor (MOS) transistor, wherein a gate of the MOS transistor is connected the resistor and the current source, a source of the MOS transistor is connected to the output terminal of the voltage buffer, and a drain of the MOS transistor is connected to the capacitor; and
   a tuning block, wherein an input terminal of the tuning block is connected the drain of the MOS transistor of the voltage biasing circuit, wherein the current source is configured to output a current that generates a voltage across the resistor that is lower than the threshold voltage of the MOS transistor,
   wherein the tuning block comprises:
      a first varactor connected at one end to the input terminal and at the other end to a second capacitor and a second resistor; and
      a second varactor connected at one end to the input terminal and at the other end to a third capacitor and a third resistor, wherein the second resistor is connected to the third resistor.

6. The tuning circuit of claim 5, wherein the second capacitor is connected to a positive output terminal and the third capacitor is connected to a negative output terminal.

7. The tuning circuit of claim 6, wherein the cathode of the first varactor is connected to the positive output terminal via the second capacitor and the cathode of the second varactor is connected to the negative output terminal via the third capacitor.

8. The tuning circuit of claim 5, wherein at least one of the first varactor and the second varactor is an accumulation mode MOSFET (AMOS) varactor.

9. The tuning circuit of claim 5, wherein the voltage buffer is an OPAMP that is configured as a unity gain buffer amplifier.

10. A data processing system comprising:
a voltage biasing circuit; and
a data processing circuit processing data by using a bias voltage output from the voltage biasing circuit,
wherein the voltage biasing circuit comprises:
a metal-oxide-semiconductor (MOS) transistor;
a voltage control circuit controlling a voltage between a gate and a source of the MOS transistor to operate in a sub-threshold range;
a capacitor connected to the MOS transistor; and
a unity gain buffer amplifier comprising an output terminal connected to the source,
wherein the voltage control circuit comprises a resistor connected to an input terminal of
the unity gain buffer amplifier and the gate.

11. The data processing system of claim 10, wherein the voltage control circuit further comprises a current supply source connected to the resistor and the gate.

12. The data processing system of claim 11, wherein a voltage level applied by the current supply source across the resistor is lower than a threshold voltage of the MOS transistor to set the transistor to operate in the sub-threshold range.

13. The data processing system of claim 10, wherein the data processing circuit further comprises:
a memory device receiving the bias voltage;
a processor controlling operations of the memory device;
a system bus connected to the memory device and the processor; and
an image sensor that converts an optical signal to an electric signal.

14. The data processing system of claim 13, wherein the image sensor is one of a charge-coupled device (CCD) or a complementary metal-oxide semiconductor (CMOS) image sensor.

15. The data processing system of claim 13, wherein the data processing circuit further comprises a wireless interface connected to the processor and configured to wirelessly communicate data with an external wireless apparatus.

* * * * *